United States Patent [19]

Izumi et al.

[11] 4,400,444
[45] Aug. 23, 1983

[54] MAGNETIC RECORDING MEDIA AND PROCESS OF PRODUCING THEM

[75] Inventors: Toshiaki Izumi; Fumio Maruta; Takayoshi Kobuke; Kiyoshi Noguchi, all of Tokyo, Japan

[73] Assignee: TDK Electronics Co., Ltd., Tokyo, Japan

[21] Appl. No.: 384,604

[22] Filed: Jun. 3, 1982

[30] Foreign Application Priority Data

Jun. 3, 1981 [JP] Japan .................................. 56-84424

[51] Int. Cl.³ .......................................... H01F 10/02
[52] U.S. Cl. .................................... 428/694; 427/128; 427/132; 427/251; 428/900
[58] Field of Search ................................ 427/128-132, 427/251; 428/694, 900

Primary Examiner—Bernard D. Pianalto
Attorney, Agent, or Firm—Oblon, Fisher, Spivak, McClelland & Maier

[57] ABSTRACT

A magnetic recording medium having a ferromagnetic layer formed by oblique vapor deposition wherein the residual magnetic flux density in the width direction of the recording medium is larger than the residual magnetic flux density in the longitudinal direction shows the SN ratio in a practical level at recording in the width direction.

3 Claims, 5 Drawing Figures

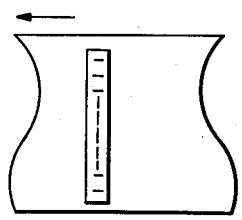
FIG. 1
FIG. 2
FIG. 4
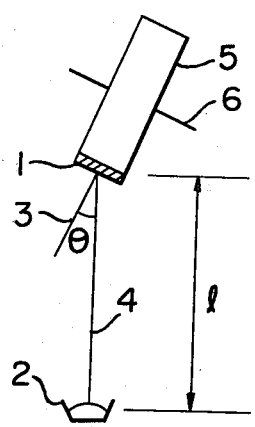
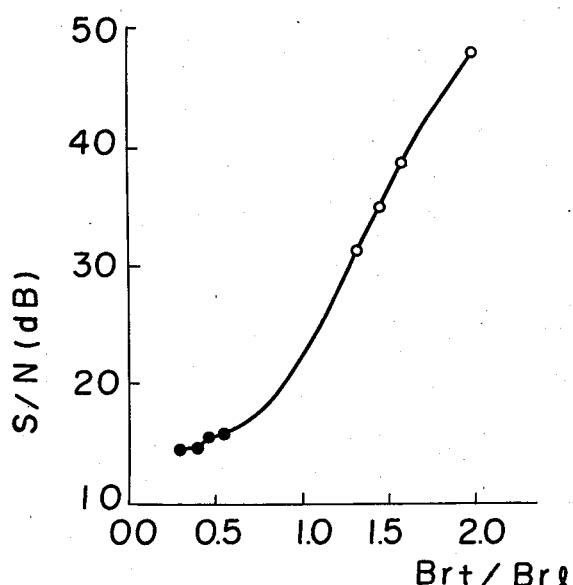
FIG. 3
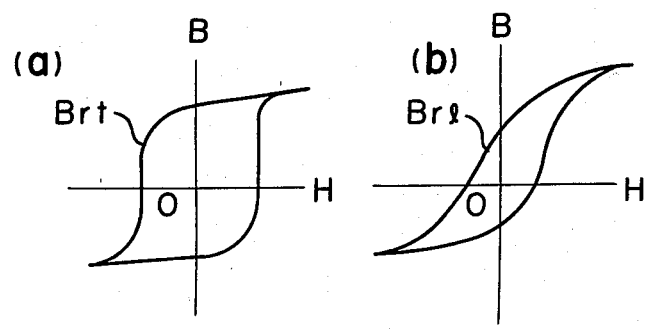
FIG. 5

MAGNETIC RECORDING MEDIA AND PROCESS OF PRODUCING THEM

BACKGROUND OF THE INVENTION

1. Field of the Invention

This invention relates to a magnetic recording medium effective for a width direction recording system and a process of producing such a magnetic recording medium.

2. DESCRIPTION OF THE PRIOR ARTS

Recently, magnetic recording media as well as the recording and reproducing techniques have made remarkable progress and new techniques about, in particular, perpendicular magnetic recording system, super thin magnetic medium by plating, vacuum vapor deposition, etc., and integrated heat, etc., are progressing for practical use.

In addition to such technical tendency, a magnetic recording system tends to change the situation from an AC bias system and a helical scanning system to a PCM fixed head V. T. R. system.

Also, under such circumstances, a system of recording and reproducing in the width direction of a magnetic recording tape is now under investigation. That is, as shown in FIG. 1 and FIG. 2 of the accompanying drawings, in the foregoing system, head gaps are disposed in the vertical direction to the lengthwise direction, i.e., the travelling direction of a magnetic recording medium or tape and magnetized patterns are formed in the width direction of the recording medium. Such a magnetic recording system has the features that the positioning accuracy is improved for width direction tracks and perpendicular magnetizable components are liable to be easily magnetized as compared to a longitudinal direction recording system, and hence is being watched as a system having bright future.

However, a conventional magnetic recording medium most widely used at present is one prepared by coating a coating composition composed of ferromagnetic particles dispersed in a binder on a web support of a high molecular compound as typified by cassette tape and video tape. Furthermore, for improving the recording and reproducing characteristics in the longitudinal direction, various efforts have been made for improving the coercive force Hc, the residual magnetic flux density Br, and the squareness ratio Br/Bm in the longitudinal direction.

Also, since a magnetic orientation method has been employed for improving these magnetic characteristics, the ratio of the width direction residual magnetic flux density $Br_t$ to the longitudinal direction residual magnetic flux density $Br_l$ is less than 1. Therefore, such a magnetic recording medium does not show preferred magnetic characteristics for width direction recording and the SN ratio obtained by such a recording medium is only the values less than 20 dB as shown by black dots in FIG. 3.

Moreover, a coating type magnetic recording medium has the property that the magnetic particles arrange of oneself in the longitudinal direction by the shearing stress at coating even when a magnetic orientation treatment is not applied at coating and hence a magnetic recording medium of $Br_t > Br_l$ can not be principally obtained.

SUMMARY OF THE INVENTION

As the result of various investigations, it has been found that a magnetic recording medium having a magnetic recording layer oriented in the width direction is obtained by selecting the condition at the case of forming a ferromagnetic layer on a substrate by physical adsorption such as vapor deposition and further it has also been found that in the magnetic recording medium having the $Br_t/Br_l$ ratio of higher than 1.5, the SN ratio at recording in the width direction can be improved to a practical level.

Thus, the invention provides a magnetic recording medium comprising a non-magnetic web substrate having at least one ferromagnetic layer characterized in that the width direction residual magnetic flux density of the web substrate ($Br_t$) is larger than the longitudinal direction residual magnetic flux density ($Br_l$).

BRIEF DESCRIPTION OF THE DRAWINGS

FIG. 1 and FIG. 2 are views explaining integrated heads for recording and reproducing in width direction, FIG. 3 is a graph showing the relation between the $Br_t/Br_l$ ratio and the SN ratio at $\lambda = 0.5$ $\mu$m, FIG. 4 is a schematic view showing the state of oblique vapor deposition in width direction, and FIGS. 5(a) and (b) are graphs showing the magnetic hysterisis curves of the thin ferromagnetic layer by VSM.

DESCRIPTION OF THE PREFERRED EMBODIMENTS

This invention has been made in view of the foregoing circumstances and the magnetic recording medium of and by the invention will be practically explained by referring to the accompanying drawings.

FIG. 4 is a view showing the relation of the position of a web substrate to be vapor deposited and the position of a vapor deposition source at vacuum vapor deposition, in particular the oblique vapor deposition in the width direction in this invention. In the figure, numeral 1 shows a cross sectional view of a web substrate of a high molecular compound, 2 is a vapor deposition source, and 3 is a perpendicular line to the face of the substrate 1. The angle $\theta$ formed by the perpendicular line 3 and the direction 4 of vapor particles striking the surface of the substrate is generally called as an incident angle.

Numeral 5 is a supporting member for the web substrate 1 and since the central axis 6 of the supporting member 5 is not perpendicular to the striking direction 4 of the vapor deposition particles, i.e., the direction of the central axis 6 is oblique to the incident or striking direction of the vapor deposition material, the ferromagnetic material can be vapor deposited on the web substrate obliquely to the width direction thereof. The support 5 can be also used for controlling the temperature of the substrate to be vapor deposited.

FIGS. 5(a) and (b) are magnetic hystresis curves (B-H curves) of the thin ferromagnetic layer obtained using VSM (i.e., vibration sample type magnetometer). FIG. 5(a) is the case of measuring the magnetic hystresis in the width direction and FIG. 5(b) is the case of measuring it in the longitudinal direction, the residual magnetic flux densities thereof corresponding to $Br_t$ and $Br_l$, respectively. In the case of a coated magnetic recording tape or a thin layer type magnetic recording tape obtained by a conventional oblique vapor deposition method, the relation of these values is reversed.

Then, the invention will be explained in more detail by the following practical example.

EXAMPLE

A sample was first prepared by forming a thin ferromagnetic layer composed of a cobalt-nickel alloy on a web film of polyethylene terephthalate having a thickness of 16 μm by oblique vapor deposition in the width direction of the web film. In this case, the cobalt/nickel component ratio of the alloy was 4:1 by weight ratio, the pressure at the vapor deposition was $6.7 \times 10^{-3}$ Pa ($5 \times 10^{-5}$ Torr), the distance l between the film and the vapor deposition source was about 20 cm, and the vapor deposition rate was 200 Å/sec. Thus, a ferromagnetic layer having a thickness of 800–1000 Å. In the vapor deposition, by controlling the incident angle to the width direction and the travelling speed of the web film, the magnetic recording media having the $Br_t/Br_l$ ratios of 1.3, 1.5, 1.7, and 2.0 were obtained.

On the other hand, for measuring the electromagnetic conversion characteristics, one of integrated heads corresponding to one track in FIG. 1 and FIG. 2 was prepared. The head gap was 0.3 μm, the wound number of coil was 10 turns, the bias frequency was set at 100 KHz, and the core portion was formed by a Mn-Zn series ferrite.

About each of the samples, the recording and reproducing characteristics in the width direction at a wave length of 0.5 μm were measured using the head and the results are shown by the white dots in FIG. 3. Also, the input level was fixed by the input level immediately before the saturation of the head, the maximum output was defined as S using the bias as the variable, and the erase noise in this case was defined as N to define the SN ratio.

From the results shown in foregoing FIG. 3, it is understood that when the $Br_t/Br_l$ ratio is higher than 1.5, the SN ratio is higher than 35 dB, which is for the present in a practical level.

As explained above in detail, the magnetic recording medium of this invention is effective for recording in the width direction.

We claim:

1. A magnetic recording medium comprising a non-magnetic web substrate, having at least one ferromagnetic layer formed thereon characterized in that the residual magnetic flux density in the width direction of the web substrate ($Br_t$) is larger than the residual magnetic flux density in the lengthwise direction thereof ($Br_l$).

2. The magnetic recording medium as claimed in claim 1 wherein the $Br_t/Br_l$ ratio is larger than 1.5.

3. A process of producing a magnetic recording medium by forming a ferromagnetic layer on a non-magnetic web substrate by a vaccum deposition method characterized in that a cylindrical supporting member for the web substrate is used and the ferromagnetic layer is formed on the web substrate by oblique vapor deposition in the width direction in such a manner that the incident direction of the vapor depositing material is oblique to the direction of the central axis of the supporting member.

* * * * *